United States Patent [19]
Juniman

[11] Patent Number: 5,856,743
[45] Date of Patent: Jan. 5, 1999

[54] POSITION-DETERMINING APPARATUS

[75] Inventor: Jonathan Juniman, Harleysville, Pa.

[73] Assignee: Honeywell Inc., Minneapolis, Minn.

[21] Appl. No.: 828,681

[22] Filed: Mar. 31, 1997

[51] Int. Cl.[6] .............................. G01B 7/14; G01B 7/00; F03B 7/07; F16K 37/00

[52] U.S. Cl. .............................. 324/207.25; 324/207.22; 116/277; 137/554

[58] Field of Search ........................ 324/207.25, 207.22, 324/207.2, 207.21, 235, 173, 174, 207.11, 207.13, 207.14; 341/15; 307/16; 116/277; 137/551, 554

[56] References Cited

U.S. PATENT DOCUMENTS 5,025,213  6/1991  Dobler et al. ...................... 324/207.25

Primary Examiner—Walter E. Snow
Attorney, Agent, or Firm—Anthony Miologos

[57] ABSTRACT

An apparatus is provided for determining the position of a shaft that is rotatably displaceable about a longitudinal axis. The apparatus includes a magnet, first and second magnet-detecting devices that are arranged adjacent the shaft, and a third magnet-detecting device mounted on the shaft. A rotatably displaceable disk having the magnet mounted thereon is arranged to allow the magnetic field produced by the magnet to pass over and activate each of the magnet detection devices sequentially. A position-determining circuit connected to the magnet-detecting devices, measures the time interval that the magnet-detecting devices are sequentially activated by the magnetic field and applies the time so measured to a position-determining scheme. The position-determining scheme uses the time measured and the physical geometry of the apparatus to determine the position of the shaft.

14 Claims, 3 Drawing Sheets

POSITION-DETERMINING APPARATUS

BACKGROUND OF INVENTION

The present invention relates generally to position-determining devices and more particularly to an apparatus for determining the absolute position of a rotating shaft.

It is a common problem to want to know the position of a device whose position is being controlled by an actuator or some other means. For example, in the controls industry, devices such as valves, each having a valve stem or valve shaft which is rotatable by an actuator, are typically used to control the flow of liquids or various gasses associated with the industrial process. In these applications, it is a common need to know the precise absolute position of the controlled shaft or stem. This information allows for an improved understanding of the process and, subsequently, a more-accurate control of the process by a process control system.

A number of prior solutions are known for measuring or determining this aforementioned position. One method is the use of linear variable differential transformers which can provide accurate positional information. However, they require a mechanical linkage to translate the positional information to a sensor and, additionally, consume a relatively high amount of power in their operation.

Slidewire, potentiometers, or other rotary transducers again require a mechanical link to the controlled device and also have the disadvantage of a sliding electrical contact which can cause long-term unreliability as well as having a potential for producing arcing and/or sparking, precluding the use of these devices in volatile environments.

Hall effect transducers, as they are currently used, generally require a mechanical linkage.

Additionally, all of the aforementioned devices and methods require the use of analog-to-digital circuits that convert analog positional information to the digital signals normally required by modern computer-controlled industrial process control systems.

Therefore, it is an object of the present invention to provide a reliable position-determining apparatus that does not require a mechanical linkage between the apparatus and a rotatable shaft.

It is a further object of the present invention to provide a position-determining apparatus that has long-term reliability and is cost effective.

It is a further object of the invention to provide a position-determining apparatus that exhibits the benefits of a greatly reduced parts count when interfacing the resultant positional signals to a computer-controlled industrial process control system.

SUMMARY OF THE INVENTION

The apparatus of the present invention contemplates the use of a plurality of magnet-detecting devices, and a rotor disk having a magnet or a magnetic field source mounted thereon. The rotor disk is arranged to allow the magnetic field produced by the magnet to pass over each of the magnet-detecting devices sequentially. The center axis of the rotor disk is aligned along the longitudinal axis of the shaft or valve stem whose position is to be measured.

A first magnet-detecting device is mounted to the apparatus in a first position adjacent the rotatable shaft and along a rotational center line of the rotor disk where the aforementioned magnet is located. The first magnet-detecting device is arranged to produce a first detection signal responsive to the detection of the magnetic field. A second magnet-detecting device is mounted to the apparatus in a second position also adjacent the rotatable shaft but on an opposite side from the first magnet-detecting device. The second magnet-detecting device is also positioned along the rotational center line of the disk. The second magnet-detecting device is arranged to produce a third detection signal responsive to the detection of the magnetic field. A third magnet-detecting device is mounted to the rotatable shaft. The third magnet-detecting device is also positioned along the aforementioned rotational center line of the disk between the first and the second magnet-detecting devices. The third magnet-detecting device is arranged to be rotatably displaced along the rotational center line of the disk in direct relationship to the rotation of the shaft. The third magnet-detecting device produces a second detection signal responsive to the detection of the magnetic field.

The rotor disk allows the magnetic field from the magnet to pass over each of the three magnet-detecting devices in sequence, as the rotor disk travels in a clockwise direction. As the disk is rotated, the magnetic field passes over and is coupled to the first magnet-detecting device, which produces the first detection signal. As the disk is further rotated, the magnetic field is uncoupled from the first magnet-detecting device. The magnetic field than passes over and is coupled to the third magnet-detecting device, the magnet-detecting device associated with the valve shaft, producing the second detection signal. As the disk is further rotated, the magnetic field is uncoupled from the third magnet-detecting device. Upon further clockwise rotation of the disk, the magnetic field is coupled to second magnet-detecting device, producing the third detection signal. Finally, the further rotation of the disk will uncouple the magnetic field from the second magnet-detecting device.

A counting scheme is arranged to receive the first, the second, and the third detection signals. The counting scheme starts a first counting sequence when the first detection signal is received. When the second detection signal is received, the first count is halted and a first count signal is generated. The counter is then initiated and a second counting sequence started. When the counting scheme receives the third detection signal, the second counting sequence is halted and a second count signal is generated.

The first and second count signals are read by a shaft position-determining scheme whereby the first and the second count signals are used to calculate the position of the shaft based on a ratio between the time measured by the count signals and the physical geometry in degrees between the first and second magnet-detecting devices. The ratio provides the location of the third magnet-detecting device and, therefore, the absolute position of the shaft along its longitudinal axis.

Thus, there is provided an apparatus for determining the position of a rotatable shaft and which offers long-term reliability and is cost effective in its operation. The present invention further benefits from the absence of the need to have sensed analog positional information translated into digital information, which is typically required by modern computer-controlled industrial process control systems.

BRIEF DESCRIPTION OF THE DRAWINGS

A better understanding of the invention may be had by reading the following detailed description in conjunction with the drawings in which.

DETAILED DESCRIPTION OF THE INVENTION

Figure 1:
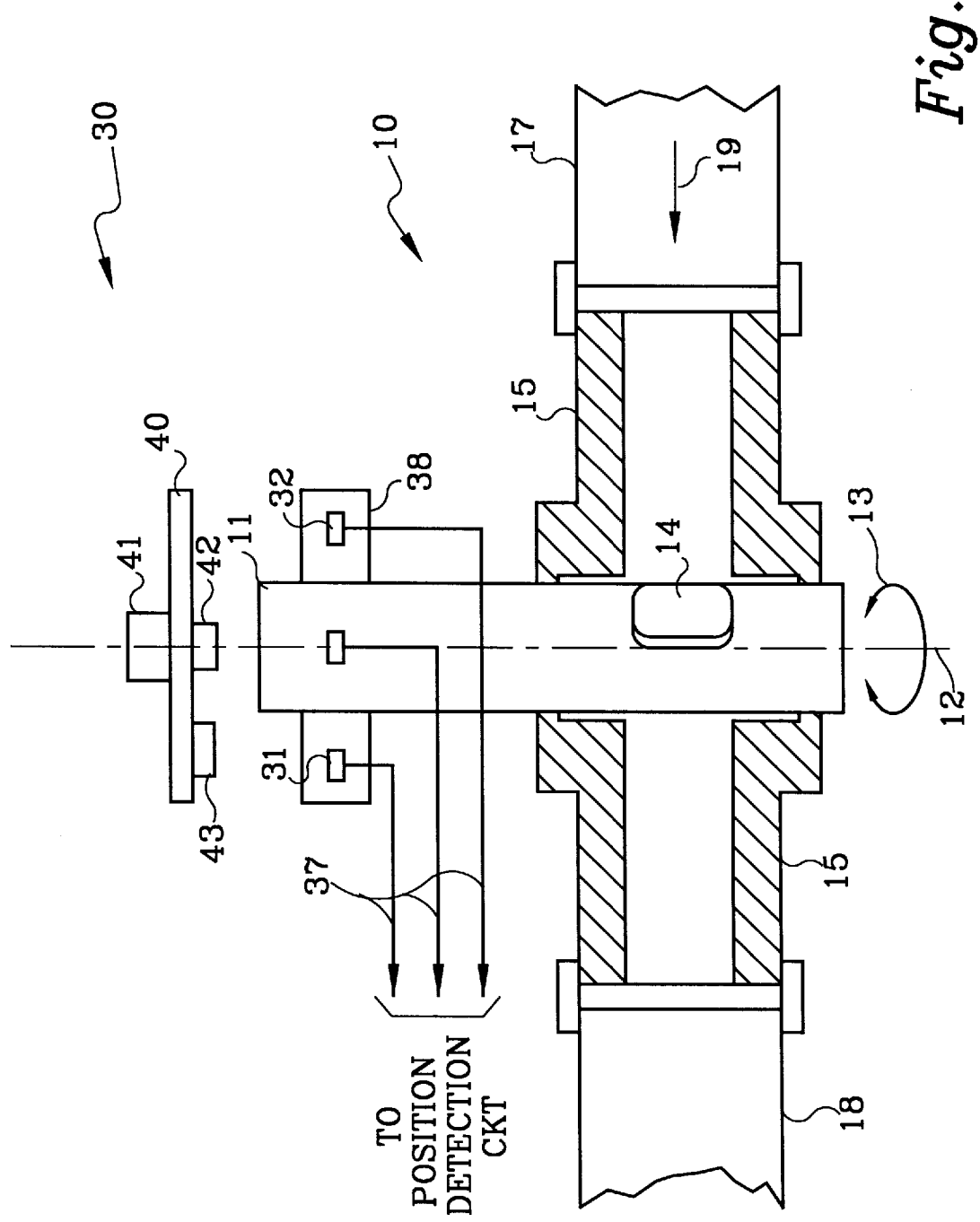
FIG. 1 shows the position-determining apparatus of the present invention as it would be used to advantage on a valve having a rotatable valve shaft or stem.

A typical valve 10, where the present invention is used to advantage, is shown in FIG. 1. Valve 10 is comprised of a valve body 15, suitably connected on one end to a conduit 17 and on an opposite end to a conduit 18. A valve shaft 11 extends through valve body 15 and includes an opening or orifice 14 extending through the shaft. The valve shaft 11 is disposed to be rotatably displaceable along a longitudinal axis shown as 12, in the directions shown as 13. Typically, the valve shaft 11 controls the flow of a controlled medium such as a liquid, or a gas, from one side of the valve body 15 and conduit 17 to the opposite side of the valve body 15 and conduit 18.

The method in which valve shaft 11 controls the flow of a controlled medium will now be explained. This explanation will be made with the flow of the controlled medium moving in the direction shown by arrow 19, or from conduit 17 to conduit 18. As will be understood by those skilled in the art, the controlled medium can also flow in the opposite direction, from conduit 18 to conduit 17. Valve shaft 11 will operate in the same manner with flow in either direction and is not limited thereto. The flow is controlled by rotating valve shaft 11 in either direction 13. When valve 10 is in a closed position, a solid surface of valve shaft 11 is presented to the normal direction of medium flow. Rotational displacement of the valve shaft 11 will progressively move the solid surface away from the medium allowing opening 14 to proportionally open from a partially-open position to a fully-open position.

It will be understood by those skilled in the art that when the solid surface of valve shaft 11 is presented to the controlled medium, the flow of the medium is effectively stopped from flowing through valve shaft 11 to conduit 18. Rotational displacement of the valve shaft 11 thereby presenting opening 14 to the medium, allows the medium to flow through the valve shaft 11 and to conduit 18. The amount of flow across the valve shaft 11 is controlled by the amount of opening 14 that is presented to the medium. A small presentation allows only a small amount of flow to occur, while the full presentation of opening 14 would allow a maximum amount of the controlled medium to flow. Therefore, the amount of flow between conduit 17 and conduit 18 is directly proportional to the rotational displacement of valve shaft 11. Valve shaft 11 can be either manually rotated by hand, or connected to an actuating device (not shown) which can rotatably displace valve shaft 11 responsive to positioning signals from a process control system.

It is desirable within the environment of a process control system to know at any given time the precise position of the valve shaft 11. Additionally, it is also desirable to be able to monitor the rotational displacement of valve shaft 11 as an actuator moves or displaces the valve shaft 11, for example, as when the flow of the controlled medium is required to be increased or decreased under control of the process control system. Further, many valve actuating devices require the precise position of the valve shaft be known as it is displaced. This position is normally communicated to the valve actuating device via a feedback signal. This feedback signal is used to gauge the progress of the valve shaft rotation in order to either increase or decrease rotation. This minimizes the over or under displacement of the shaft, or as it is more commonly known in the industry, the overshoot or undershoot, respectively.

The valve 10 just explained and shown by FIG. 1 is an example of the environment where the present invention can be used to advantage It will be appreciated by those skilled in the art that the present invention can also be effectively used in other industrial control functions, such as to control furnace dampers and is not limited thereto.

Figure 2:
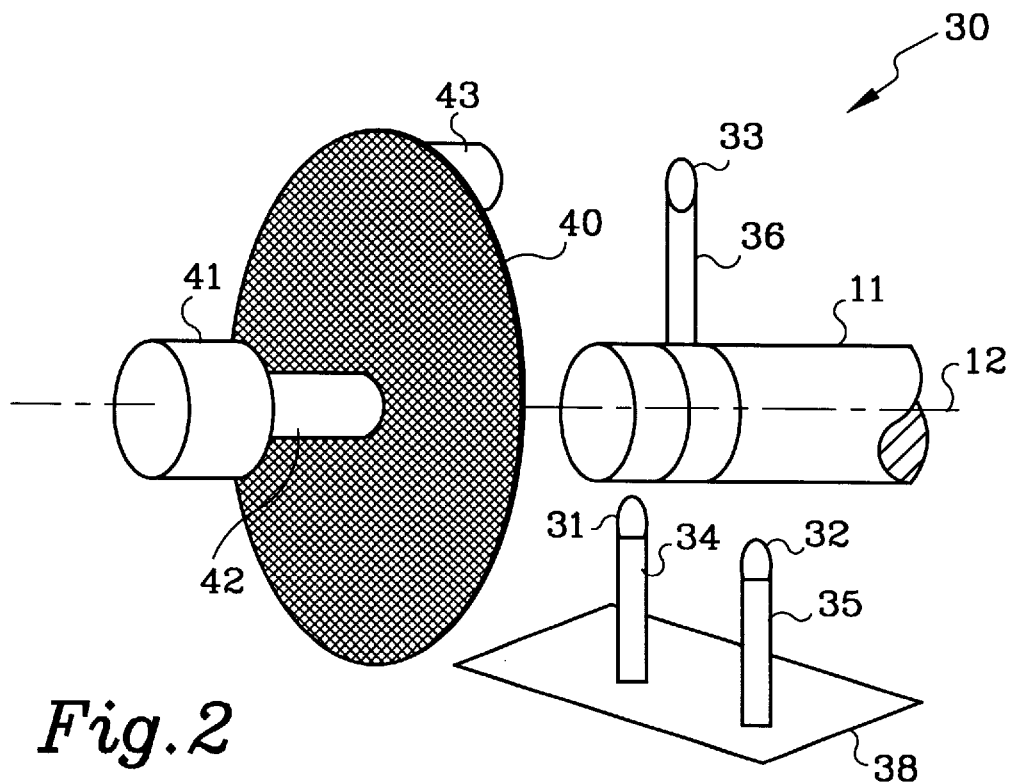
FIG. 2 shows the position-determining apparatus of the present invention in an isometric view.

With continued reference to FIG. 1, and also with reference to FIG. 2, the apparatus for determining the position of a rotating shaft of the present invention is shown generally as 30. The apparatus 30 includes stationary magnet-detecting devices 31 and 32 mounted on respective stems 34 and 35. Stems 34 and 35 are fixedly mounted on a stationary platform 38. A rotatable magnet-detecting device 33 is mounted to stem 36, which is in turn mounted to valve shaft 11. As can be seen and understood, any rotatable displacement of valve shaft 11 will also displace magnet-detecting device 33. Additionally, magnet-detecting devices 31, 32, and 33 lie within the center line of a radial axis. Magnet-detecting devices 31, 32, and 33 are each comprised of a coil or any such device that is arranged to have a pulse induced in each coil as a magnet or a magnetic field source passes over each coil. Each of the magnet-detecting devices 31, 32, and 33 further includes a signal lead 37, which is connected to the position-detection circuit of the present invention.

A rotor disk 40 is mounted in front of valve shaft 11 and magnet-detecting devices 31, 32, and 33. Rotor disk 40 is constructed of a ferromagnetic material and is mounted to a small electric motor 41 via the electric motor's shaft 42. The longitudinal axis of electric motor shaft 42 and the concentric center of rotor disk 40 are aligned along the longitudinal axis 12 of valve shaft 11. Rotor disk 40 further includes a magnet 43, mounted on a interior surface of rotor disk 40. Magnet 43 is located on rotor disk 40 adjacent its outer perimeter edge in a position where, as the rotor disk 40 is rotated, magnet 43 will pass over each of the magnet-detecting devices 31, 32, and 33. The magnet 43 can be either a permanent magnet or an electromagnet of the types that are commonly known to those skilled in the art. Magnet 43, however, should be mounted to rotor disk 43 in a manner to allow the majority of its resultant magnetic field to be directed toward the magnetic detecting devices 31, 32, and 33.

Figure 3:
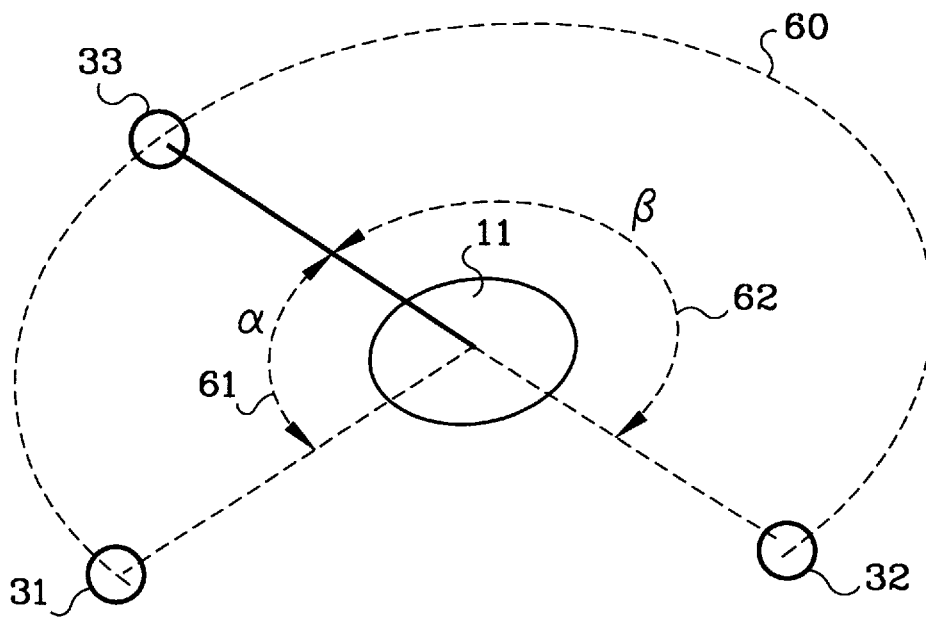
FIG. 3 shows a diagram of the geometric relationships among the magnet-detecting devices of the present invention.

Turning now to FIG. 3, a detailed explanation of the geometric relationships involved in the operation of the present invention will be discussed. As can be seen, FIG. 3 diagramatically shows the relationship of the magnet-detecting devices to each other, as would be seen by magnet 43 of rotor disk 40. Magnet-detecting devices 31, 32, and 33 all lie within the aforementioned radial axis center line shown as 60. As was previously explained, magnet-detecting devices 31 and 32 are fixedly mounted to the apparatus 30. Magnet-detecting device 33 is mounted to valve shaft 11 and is arranged to traverse along the radial axis center line 60. A rotation of valve shaft 11 along its longitudinal axis 12 would be translated by travel of magnet-detecting device 33 along axis 60 between magnet-detecting devices 31 and 32. Therefore, the location or position of valve shaft 11, at any one time, can be calculated by measuring the rotational angle between magnet-detecting device 31 to 33 providing a first angle 61 ($\alpha$) and the rotational angle between light detecting devices 33 and 32 providing the second angle 62 (β). Since magnet-detecting devices 31 and 32 are fixed, the total range of rotation can be expressed as:

$$R=\alpha+\beta$$

where "R" is the total range of rotation, "α" is the rotation in degrees between magnet detection devices 31 and 33, and "β" is the rotation in degrees between magnet detection devices 33 and 32. Thus, "R" represents the physical geometry of the apparatus. As will be understood by those skilled in the art, the physical geometry of the apparatus of the present invention is arbitrary, with a constraint that "R" is less than 360 degrees.

The apparatus of the present invention contemplates the use of time to measure the degree rotations of 61 and 62. This can be accomplished by measuring the time that magnet 43 travels in one direction sequentially between magnet-detecting devices 31, 33, and 32. A ratiometric association of time to degrees of rotation can thus be expressed as:

$$T_1/(T_1+T_2)=\alpha/\alpha+\beta$$

where, $T_1$ is the time that magnet 43 travels between magnet-detecting devices 31 and 33 and $T_2$ is the time that magnet 43 travels between magnet-detecting devices 33 and 32.

Therefore, the absolute position of the shaft can be determined by a position-determining calculation solving where along the radial center line 60 and between magnet-detecting devices 31 and 32 magnet-detecting device 33 is located. The position of magnet-detecting device 33 can be expressed as a percentage of shaft travel or "P" since it is physically mounted to shaft 11. Therefore, the following position determining algorithm or formula can be used to find the position of magnet-detecting device 33 within the total range of rotation of the apparatus:

$P=T_1/(T_1+T_2)$ $\alpha=PR$ $\beta=R-\alpha=(1-P)R$

It can be appreciated from the above-defined position-determining algorithm that the absolute position of shaft 11 can thus be ascertained by taking a time measurement between magnet-detecting device 31 and 33 ($T_1$) and magnet-detecting device 33 and 32 ($T_2$) and including the time measurements $T_1$ and $T_2$ thus obtained, into the constants of the known physical geometry of the apparatus.

Figure 4:
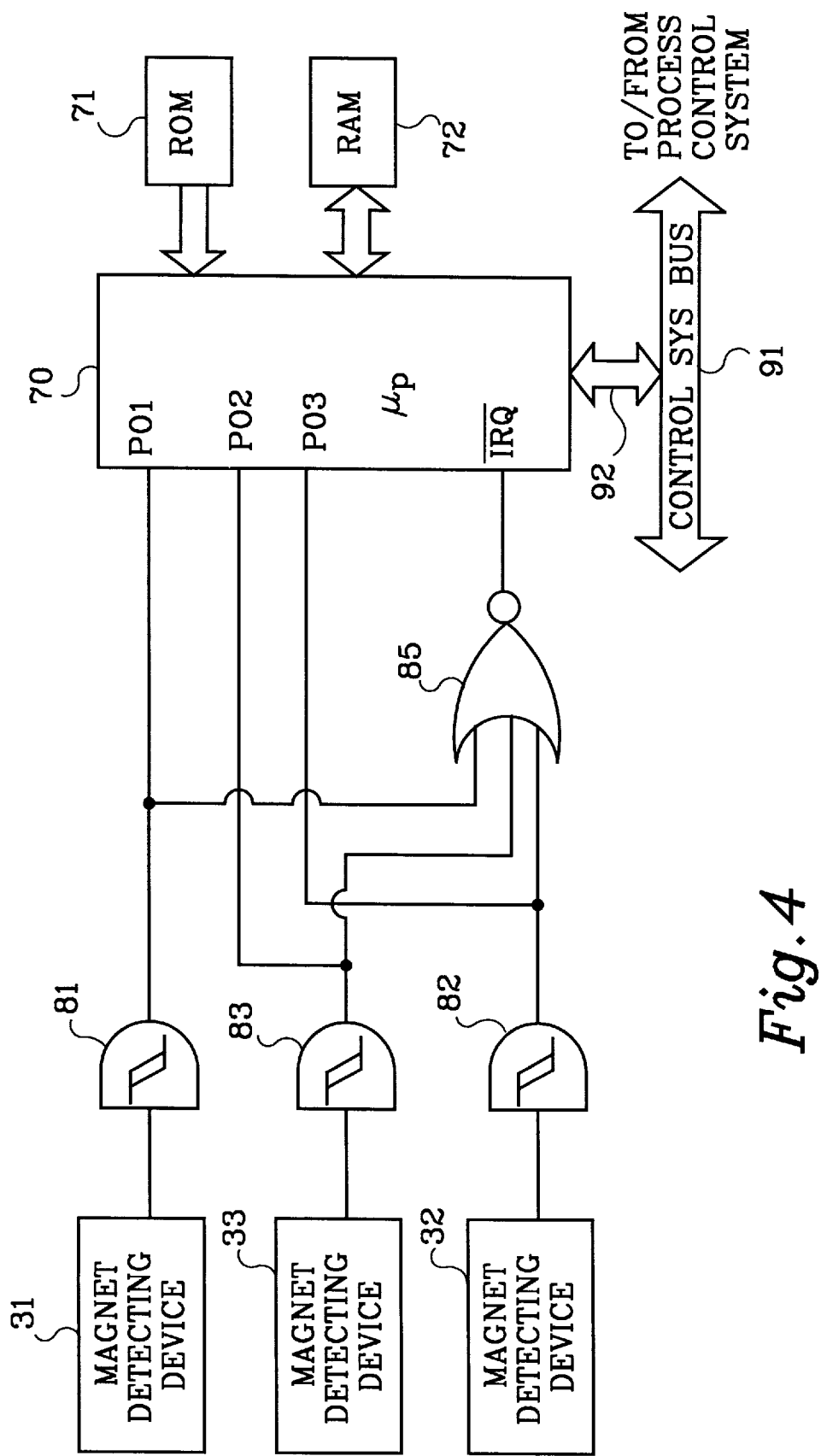
FIG. 4 shows the position-determining circuit of the present invention used to calculate the position of the rotatable valve shaft or stem.

Turning now to FIG. 4, a position-determining circuit used to calculate the position of the rotatable valve shaft 11 is shown. The position-determining circuit of the present invention includes trailing edge detection devices 81, 82, and 83 each having their respective inputs connected to the output of a respective magnet-detecting device 31, 32, and 33. Devices 81, 82, and 83 are shown in this embodiment as schmitt trigger devices but any known device that produces a signal on the transition of a negative-to-positive or positive-to-negative-going signal can be used. Each of the trailing edge detection devices 81, 82, and 83 has its respective output connected to NOR gate 85. As can be seen, an output signal from any of the devices 81, 82, and 83 will cause an output signal from NOR gate 85. The output of NOR gate 85 is connected to the Interrupt Request ($\overline{IRQ}$) input of a microprocessor 70. The output of each of the devices 81, 82, and 83 is further connected to respective I/O ports PO1, PO2, and PO3 of device 70. A Read Only Memory (ROM) 71 is associated with microprocessor 70 and is used to store the ratiometric calculating algorithm of the present invention and the operating program or processing instructions used by the microprocessor 70. A Random Access Memory (RAM) 72 is also associated with microprocessor 70 and is used as a memory store for the $T_1$ and $T_2$ counts and the digital representation of the position of the valve shaft 11.

It is contemplated that the present invention will be used with a process control system (not shown) that includes a Control System BUS 91 that is connected to microprocessor 70 via communications BUS 92. The process control system will from time to time poll microprocessor 70, requesting the transmission to the process control system of the stored digital data representing the position of the valve shaft 11. However, it will be understood by those skilled in the art that microprocessor 70 could also be connected to the local controller of a valve actuating system, thereby providing feedback signal representing the valve's position as the valve shaft is rotated to a desired position. Further, ROM 71 and RAM 72 could also be integral and an internal component of microprocessor 70 as is commonly found in the class of devices called microcontrollers. ROM 71 and RAM 72 are shown here external to device 70 to better explain the way in which the invention is used to advantage.

With renewed reference to FIG. 2 and FIG. 4, an explanation of the operation of the position-determining circuit as used to advantage in the present invention will now be made. As was previously explained, the apparatus of the present invention is used to determine a time measurement, or the time that the magnet 43 travels in a clockwise direction among magnet-detecting devices 31, 33, and 32 as the means for measuring the degree of rotation of 61 and 62.

As rotor disk 40 travels, for purposes of this embodiment in a clockwise direction, it will encounter magnet-detecting device 31 first. When magnet 43 passes over magnet-detecting device 31, the magnetic field produced by magnet 43 is inductively coupled into magnet-detecting device 31, inducing a pulse. Trailing edge detection device 81 detects the pulse and sends an output signal to NOR gate 85 and the $\overline{IRQ}$ input of microprocessor 70. Microprocessor 70 then polls its I/O ports for any input signal. Trailing edge detecting device 81 also sends its output signal to port PO1 of the microprocessor 70. Microprocessor 70, upon detection of this first detection device signal on PO1, will reset and start a counting routine. As rotor disk 40 further travels in a clockwise direction, the magnetic field emanating from magnet 43 is uncoupled from magnet-detecting device 31. The counter, however, continues counting.

Magnet 43 next passes over magnet-detecting device 33, where a pulse is induced in magnet-detecting device 33, causing trailing edge detection device 83 to send its output signal to NOR gate 85 and to port PO2. Microprocessor 70 then polls its I/O ports for any input signal. Microprocessor 70, upon detection of this second detection signal on PO2, will halt the counter routine, read and store the first count in RAM 72, and reset and start the counter routine again. As rotor disk 40 further travels in its clockwise direction, the magnetic field emanating from magnet 43 is uncoupled from magnetic detecting device 33. The counter, however, continues counting.

When the magnetic field from magnet 43 finally passes over magnet-detecting device 32, a pulse is induced in magnetic detecting device 32, causing trigger device 82 to send its output signal to NOR gate 85 and the $\overline{IRQ}$ input and port PO3 of microprocessor 70. Upon detection of this third detection signal on port PO3, the count will be halted and read and stored in RAM 72. The value stored for the first count is used for variable $T_1$ and the value stored for the second count is used for variable $T_2$ of the ratiometric algorithm explained earlier. Microprocessor 70 under control of the operating program fetches the ratiometric algorithm from ROM 72 and the first and second counts $T_1$ and $T_2$ from RAM 72 and calculates "P", or the percentage of shaft travel, and stores this value in RAM 72.

Under control of an operating routine, the apparatus can measure, calculate, and update shaft travel on a periodic basis, replacing the old data with new data. Alternatively, the position of the shaft 11 can be determined on a demand basis or when requested by a process control system. When the process control system issues a request for the latest value of shaft travel, the data is transferred via communication BUS 92 to control system BUS 91 and to a central controller of the process control system. The process control system can then translate the value received into an absolute position of the valve shaft position for display to a human operator or used as process variable in a process controlling routine. It will be appreciated by those skilled in the art that the value of shaft travel measured and calculated by the present invention can also be output to the controller of a valve shaft actuating device where it is used as a feedback signal indicating the present position of the shaft as it is being rotated by the actuator.

The present invention has been described with particular reference to the preferred embodiments thereof. It will be obvious that various changes and modifications may be made therein without departing from the spirit and scope of the invention as defined in the appended claims.

What is claimed is:

1. An apparatus for determining the position of a shaft rotatably displaceable along a longitudinal axis comprising:

means for producing a magnetic field;

first detecting means mounted to said apparatus in a first position adjacent said rotatable shaft and along a rotational center line, said first detecting means arranged to produce a first detection signal responsive to the detection of said magnetic field;

second detecting means mounted to said apparatus in a second position adjacent said rotatable shaft and along said rotational center line, said second detecting means arranged to produce a third detection signal responsive to the detection of said magnetic field;

third detecting means mounted to said rotatable shaft along said rotational center line between said first and said second detecting means, said third detecting means arranged to be displaced along said rotational center line in direct relationship to the rotation of said shaft, and said third detecting means further arranged to produce a second detection signal responsive to the detection of said magnetic field;

magnetic field directing means having said means for producing a magnetic field mounted thereon, said magnetic field directing means arranged to be rotated in a constant velocity along said rotational center line to pass over and couple and subsequently uncouple said magnetic field sequentially between said first detecting means, said third detecting means, and said second detecting means;

counting means arranged to receive said first, said second, and said third detection signals and to produce a first count signal responsive to said first and subsequently said third detection signals and a second count signal responsive to said third and subsequently said second detection signal; and position determining means arranged to receive said first and said second count signals, whereby in response to said first and said second count signals said position-determining means determines the position of said shaft along said longitudinal axis.

2. The apparatus of claim 1, wherein said means for producing a magnetic field is a permanent magnet.

3. The apparatus of claim 1, wherein said first, said second, and said third means for producing a magnetic field is an electromagnet.

4. The apparatus of claim 1, wherein said apparatus further includes an electric motor and said magnetic field directing means comprises:

a ferromagnetic disk mounted to said electric motor; and said means for producing a magnetic field is mounted to said disk along said rotational center line, whereby said electric motor rotates said disk in a constant velocity allowing said magnetic field to travel along said rotational center line coupling and subsequently uncoupling said magnetic field sequentially to said first detecting means, said third detecting means, and said second detecting means.

5. The apparatus of claim 1, wherein said apparatus further includes a position-determining circuit comprising of at least:

a microprocessor for receiving said first, said third, and said second detection signals;

a memory store connected to said microprocessor; and said counting means is a counting scheme controlled by said microprocessor and under control of said microprocessor said counting scheme starts a first counting sequence when said first detection signal is received, and upon receiving said second detection signal ending said first counting sequence and producing a first count signal, and subsequently starting a second counting sequence and ending said second counting sequence and producing a second count signal when said third detection signal is received, whereby said first and said second count signals are stored in said memory store.

6. The apparatus of claim 5, wherein said position-determining means is a position-determining scheme stored in said memory store, said position-determining scheme including a representation of the geometry of said apparatus; and responsive to said counting scheme producing said first and said second count signals, said microprocessor retrieves said first and said second count signals from said memory store and utilizes said first and said second count signals with said position-determining scheme, whereby said position-determining scheme calculates the position of said shaft along said longitudinal axis and stores said position in said memory store.

7. An apparatus for determining the position of a shaft rotatably displaceable about a longitudinal axis comprising:

means for producing a magnetic field;

first means arranged along a rotational center line, disposed to produce a first detection signal responsive to the detection of said magnetic field;

second means arranged along said rotational center line, disposed to produce a third detection signal responsive to the detection of said magnetic field;

third means mounted to said rotatable shaft and arranged along said rotational center line between said first and said second means, disposed to produce a second detection signal responsive to the detection of said magnetic field;

means for directing said magnetic field, arranged to couple and subsequently uncouple said magnetic field sequentially to each of said first means, said third means, and said second means;

means for counting arranged to receive said first, said second, and said third detection signals and to produce a first count signal responsive to said first and subsequently said third detection signals and a second count signal responsive to said third and subsequently said second detection signal; and means for determining said shaft's position arranged to receive said first and said second count signals, and determine the position of said shaft along said longitudinal axis.

8. The apparatus of claim 7, wherein said means for producing said magnetic field is a magnet and said first means is comprised of a first magnet-detecting device, whereby responsive to said magnet passing over said first magnet-detecting device said magnet induces a pulse in said first magnet-detecting device producing said first detection signal.

9. The apparatus of claim 7, wherein said means for producing said magnetic field is a magnet and said second means is comprised of a second magnet-detecting device, whereby responsive to said magnet passing over said second magnet-detecting device said magnet induces a pulse in said second magnet-detecting device producing said third detection signal.

10. The apparatus of claim 7, wherein said means for producing said magnetic field is a magnet and said third means is comprised of a third magnet-detecting device, whereby responsive to said magnet passing over said third magnet-detecting device said magnet induces a pulse in said third magnet-detecting device producing said second detection signal.

11. The apparatus of claim 7, wherein said means for directing said magnetic field comprises:

an ferromagnetic disk arranged in proximity to said first, said second, and said third means; and said means for producing a magnetic field is mounted to said disk along said rotational center line, whereby said disk is arranged to be rotated in a constant velocity allowing said magnetic field to travel along said rotational center line coupling and subsequently uncoupling said magnetic field sequentially to said first means, said third means, and said second means.

12. The apparatus of claim 11, wherein said apparatus further includes an electric motor and said ferromagnetic disk is mounted to said electric motor and said electric motor rotates said disk in a constant velocity.

13. The apparatus of claim 7, wherein said apparatus further includes a position-determining arrangement comprising of at least:

a controller for receiving said first, said third, and said second detection signals;

a memory store connected to said controller; and said means for counting is a counting scheme under control of said controller and said counting scheme starts a first counting sequence when said first detection signal is received, and upon receiving said second detection signal ending said first counting sequence and producing a first count signal, and subsequently starting a second counting sequence and ending said second counting sequence and producing a second count signal when said third detection signal is received, whereby said first and said second count signals are stored in said memory store.

14. The apparatus of claim 13, wherein said means for determining said shaft's position is a position-determining scheme stored in said memory store, said position-determining scheme including a representation of the geometry of said apparatus; and responsive to said counting scheme producing said first and said second count signals, said controller retrieves said first and said second count signals from said memory store and utilizes said first and said second count signals with said position-determining scheme, whereby said position-determining scheme calculates the position of said shaft along said longitudinal axis and stores said position in said memory store.

* * * * *